March 13, 1956  M. W. HORRELL  2,738,494
QUADRANT SIGNAL GENERATOR
Filed Feb. 9, 1953  4 Sheets-Sheet 3

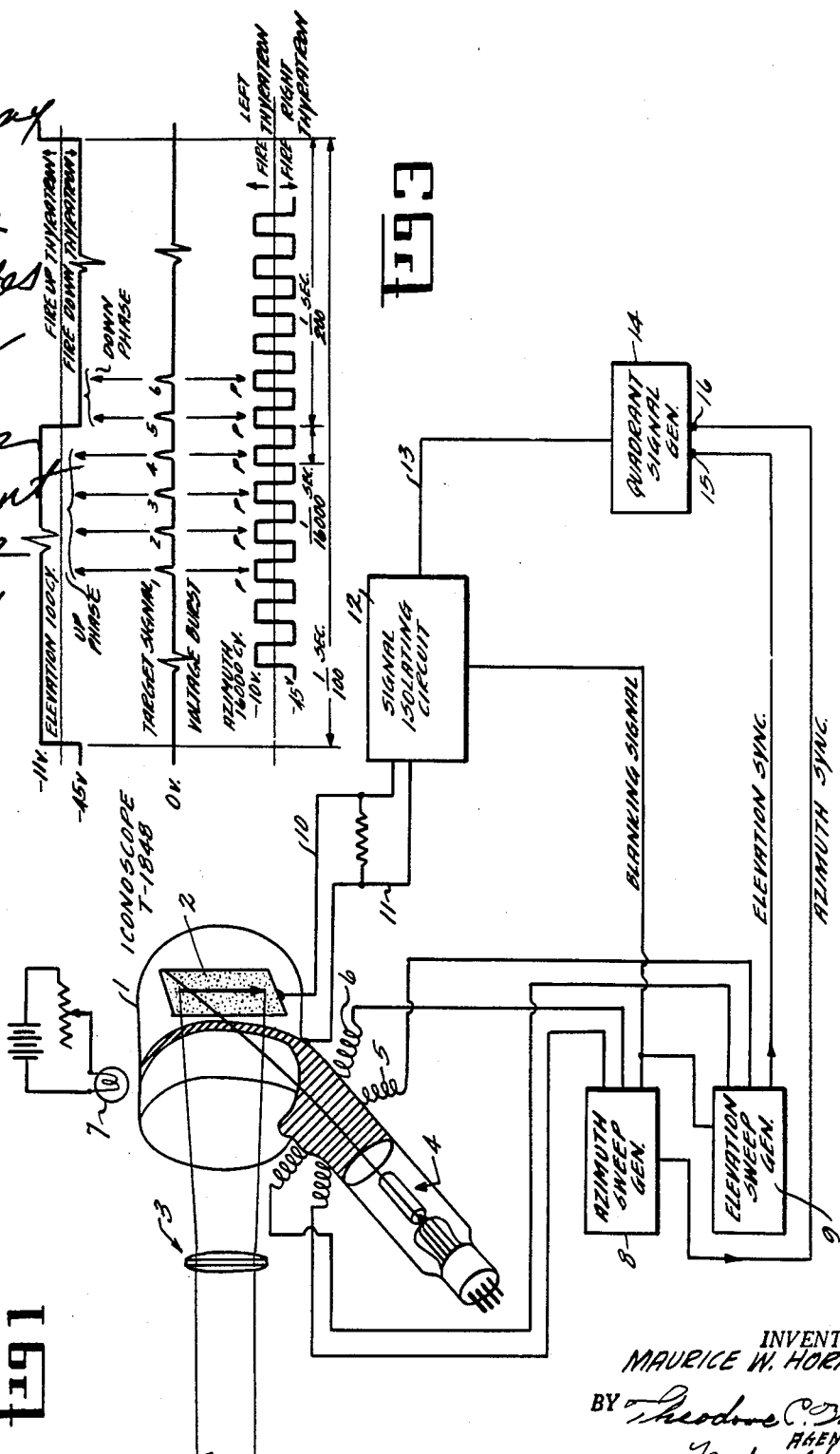

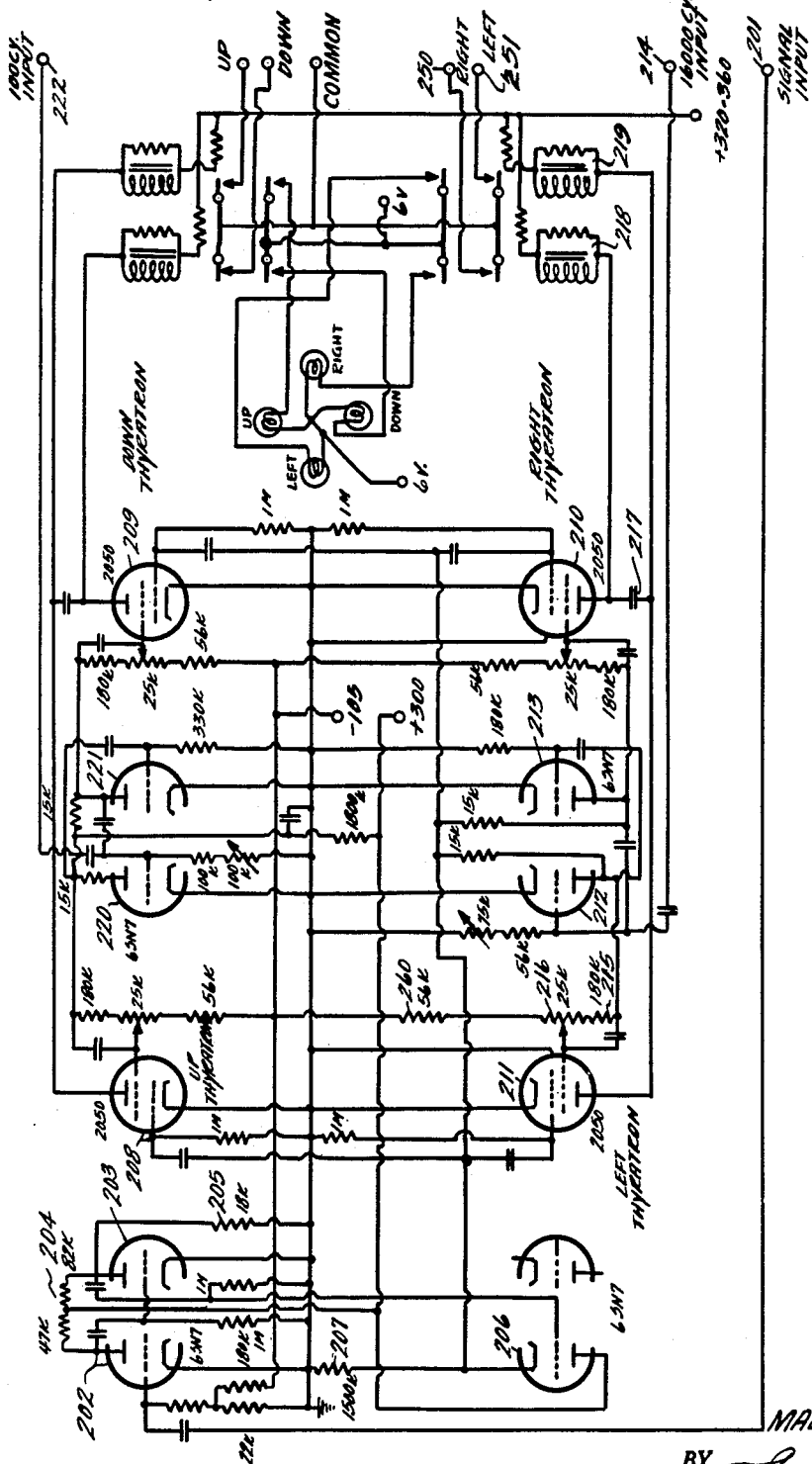

INVENTOR.
MAURICE W. HORRELL
BY Theodore C. Wood
AGENT
Nada Koontz
ATTORNEY

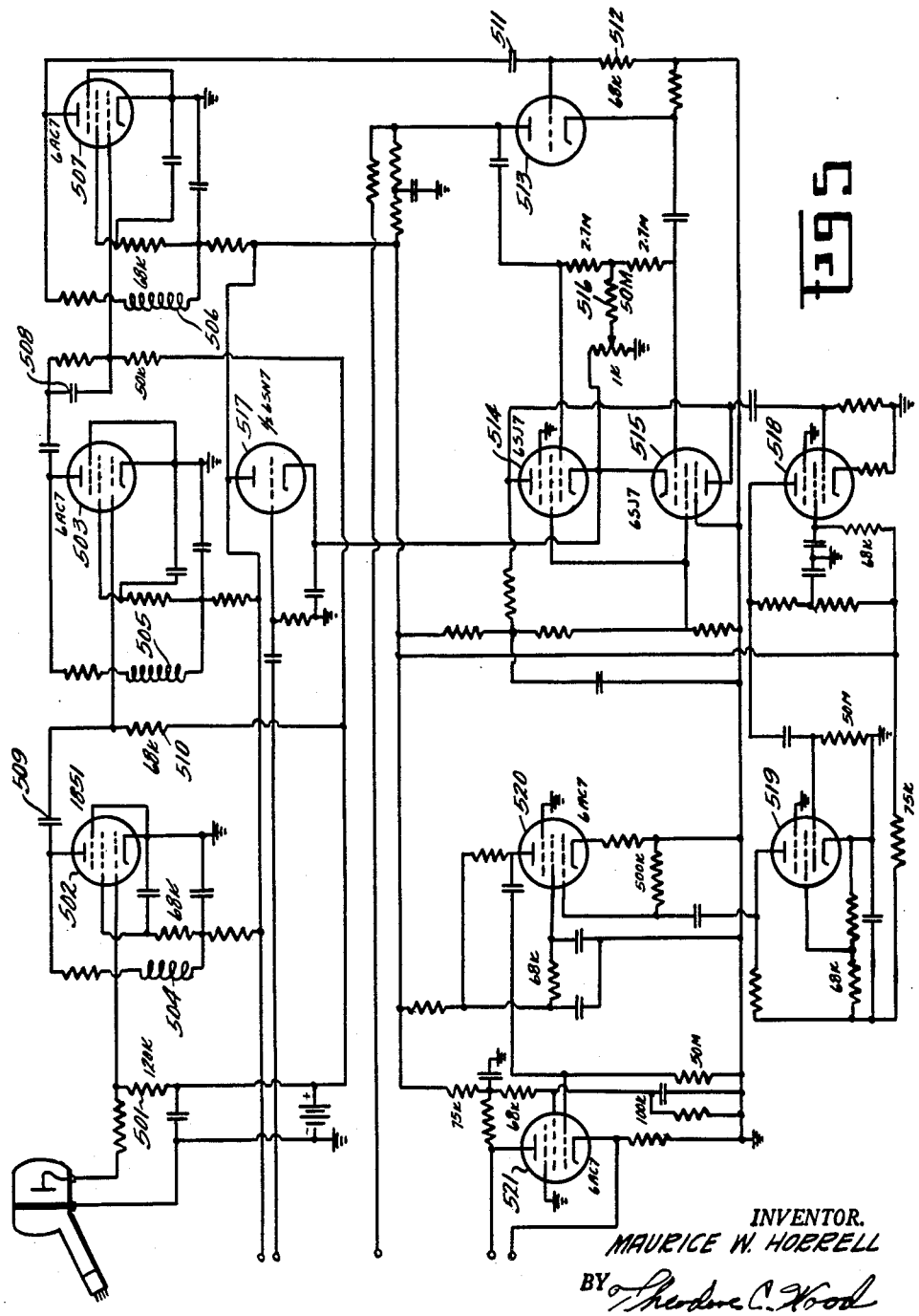

United States Patent Office 2,738,494
Patented Mar. 13, 1956

2,738,494

QUADRANT SIGNAL GENERATOR

Maurice W. Horrell, Venice, Calif., assignor to the United States of America as represented by the Secretary of the Air Force Application February 9, 1953, Serial No. 335,641

3 Claims. (Cl. 340—212)

This invention relates to control systems and more particularly to electronic target seeking apparatus.

In the general art of control systems and particularly in the art of target seeking apparatus, it is oftentimes desirable to obtain an electrical signal indicative of the quadrant of the field of view within which the target lies.

It is an object of this invention to provide an electronic apparatus which will produce an electrical signal indicative of the quadrant position of a target which lies within the field of view of the apparatus.

The above object as well as other objects, features and advantages of the apparatus of this invention will become more apparent from a consideration of the following description when taken in conjunction with the drawings wherein:

Fig. 1 is a schematic drawing in block form of a target seeking apparatus utilizing the quadrant signal generator of this invention.

Fig. 2 is a schematic diagram of a quadrant signal generator constructed in accordance with this invention.

Fig. 3 is a graph showing a family of curves of voltages at various points in the diagram of Fig. 2.

Fig. 5 is a schematic diagram of the apparatus shown in block form and identified by reference numeral 12 in Fig. 1.

Figure 4:
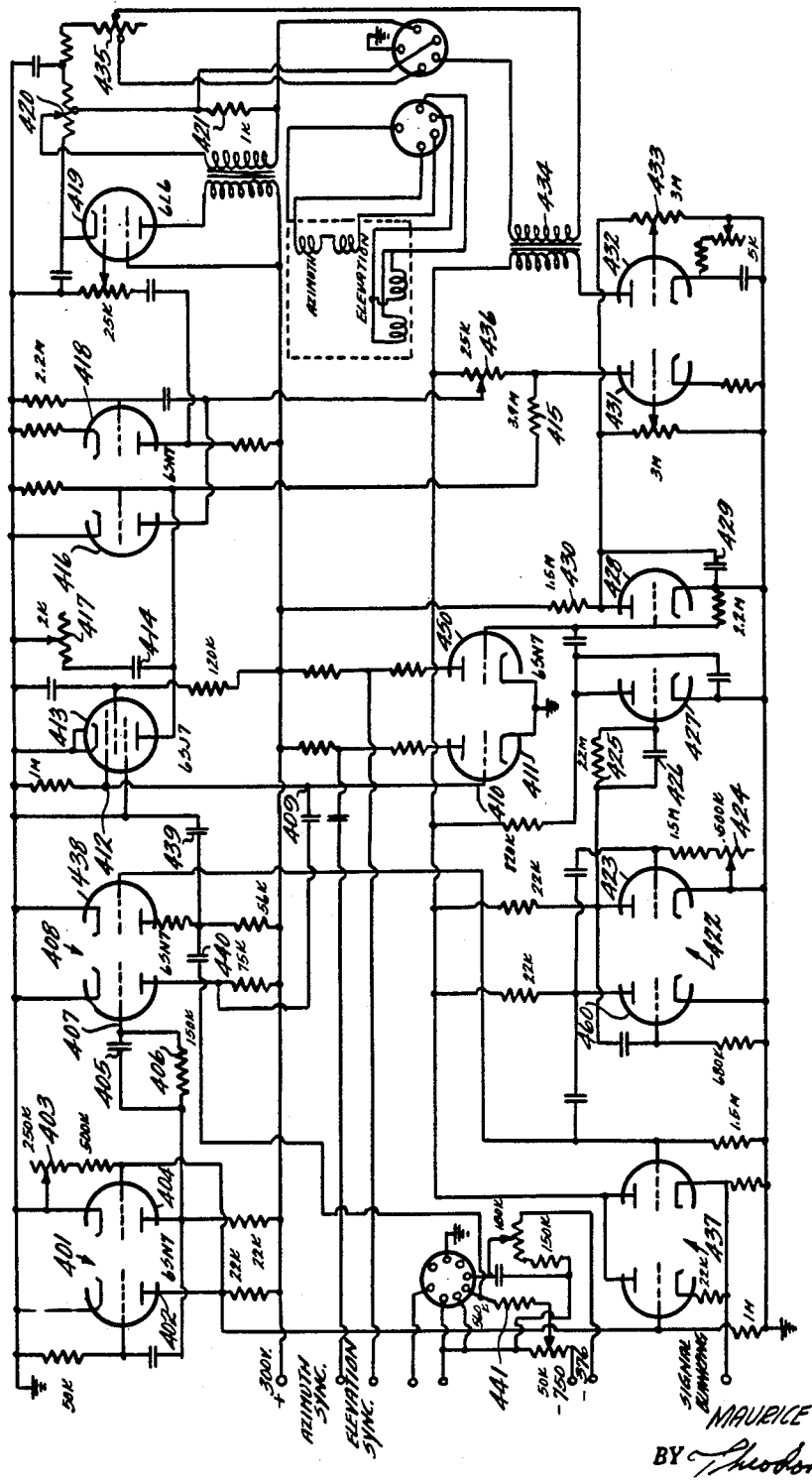
Fig. 4 is a schematic diagram of the azimuth sweep generator 8 and the elevation sweep generator 9 which are indicated in block form in Fig. 1.

Referring now to the drawings and more particularly to Fig. 1 thereof, the iconoscope tube 1 has a photosensitive mosaic electrode 2 upon which the image is focused by a suitable optical system 3. The iconoscope 1 further has an electron gun generally indicated at 4 and suitable means for deflecting the beam which may consist of magnetic deflecting coils 5 for horizontally deflecting the beam and deflecting coils 6 for vertically deflecting the beam.

The mosaic electrode of the iconoscope may be considered as a surface having very high insulation transversely (along its face) but having conductivity perpendicular to the surface. The latter conductivity may be excited in two ways: by illumination, which induces photoelectric emissions of electrons, and by bombardment, which induces emission of secondary electrons. When the surface is illuminated, the photoelectric emission gives rise to a distribution of electric potential over the surface of the mosaic, the form of which is the same as that of the illumination. When this potential distribution is scanned, the scanning beam produces secondary emission the amount of which is controlled by the potential distribution. Part of this secondary emission is collected by the collecting anode, and so enters the signal circuit. The variations in current in the signal circuit are caused by the variations in the collected secondary electrons, which in turn are caused by the variations in the potential of the surface induced by photoelectric emission.

The action of the secondary electrons is such as to cause the voltage at the signal plate to decrease when the scanning beam strikes a bright area. Hence, the signal output is "negative."

Secondary electrons not reaching the collector ring fall back to the mosaic in an uneven pattern and produce a "shading" effect. This is actually a distortion of the axis upon which the target signal rests. It may occur along the azimuth scan, along the elevation scan, or along both. Shading may reach sufficient amplitude to completely mask the desired target signals. In any case shading is undesirable and must be kept to the smallest possible value. Optimum ratio of target signal to noise and spurious signals (including shading) is obtained through proper video amplifier design, careful adjustment of the beam current, elimination of transients caused by the scanning and blanking pulses and control of the background illumination on the mosaic.

In order to cause the beam to scan the mosaic electrode 2, the deflecting coils 5 and 6 are energized by suitable sweep generators 8 and 9 respectively. The sweep generators 8 and 9 therefore determine the type of scanning pattern. There are many different patterns in which the image may be explored. Of these, the system in which the spot is swept at a linear rate from left to right and at a much slower linear rate from top to bottom seems to offer the greatest advantages.

The signals produced by the scanning action of the electron beam upon the mosaic electrode tube appear on the conductors 10 and 11, and these signals are fed to the apparatus 12, which although shown in the drawings in merely blocked form is intended to indicate any apparatus capable of producing an isolated signal output, that is, when the input signal is representative of a plurality of light intensity contrasts in the field of view, that apparatus will select only one of the various signals dependent upon a particular selected characteristic, such as for example, the amplitude of the signals, and produce a signal representative of only that signal in its input which has the greatest amplitude. The output signal from the apparatus 12 appears on conductor 13, which is fed to the input of the quadrant signal generator 14. To the input 15 of the quadrant signal generator 14 is applied an elevation synchronizing signal produced by the elevation sweep generator 9 and to the input 16 of the quadrant signal generator is applied an azimuth sync signal produced by the azimuth sweep generator 8. The details of the quadrant signal generator 14 are shown in Fig. 2, reference being made thereto. In that figure the signal input 201 has applied thereto the output signal from apparatus 12. This signal is amplified and inverted in tube 202, whose output is applied to the control grid of tube 203. Due to the voltage dividing action of resistors 204 and 205, a low plate voltage results in the tube 203. Hence the large negative target signal pulse on the grid of tube 203 drives the tube to negative grid cutoff. This results in a constant amplitude plate signal for considerable variation in target signal input. This positive polarity plate signal is coupled to tube 206 whose circuit functions as a cathode follower, the gain of which is approximately 0.9. The constant 15 volt output from this stage appears as a positive pulse across resistor 207 from which it feeds in parallel the control grids of the Up thyratron 208, the Down thyratron 209, the Right thyratron 210 and the Left thyratron 211. Because of the shunt capacity to ground of the four thyratron control grids and their associated wiring is sufficient to load a high impedance plate resistor source at higher target signal frequencies, it is necessary to feed the four thyratrons from a lower impedance source such as 1500 ohms. This accounts for the use of the cathode follower stage including tube 206.

Tubes 212 and 213 together with their associated circuits form a symmetrical multivibrator which is synchronized by the negative sync pulses from the azimuth sweep generator which are applied to the azimuth sync input 214. The symmetrical square wave from the anode of tube 212 is applied to the shield grid of the Left thyratron through the series voltage dividing network of resistors 215, 216 and 260. Since these three series resistors return to −105 volts, resistor 216 may be adjusted for −10 volts at the shield grid when the multivibrator section connected to the Left thyratron is nonconducting. With this adjustment of resistor 216, the square wave amplitude is divided down from the plate to approximately thirty-five volts peak to peak amplitude at the shield grid. Hence with the multivibrator synchronized as it is, the shield grid of the Left thyratron is at −10 volts during the left half of the scanning excursion and at −45 volts during the right half of the excursion. By similar reasoning the 180° out of phase square wave voltage from the anode of tube 213 causes the Right thyratron shield grid to be at −10 volts during the right half of the scanning excursion and at −45 volts during the left half of the scanning excursion. At the shield grid voltage of −10 volts each of the thyratrons is capable of being fired by a 15 volt positive target signal pulse on their control grids but at −45 volts shield grid voltage the signal pulse fails to fire the thyratron. Consequently, with equal target signal pulses occurring simultaneously on each of the Left and Right thyratron control grids, either the Left or the Right thyratron will fire depending upon which one has a shield grid bias of −10 volts. In other words, when the target signal appears in the left half of the field of view, the Left thyratron will be fired, since its shield grid bias is −10 volts while the Right thyratron shield grid bias is at −45 volts. If the target appears in the right half of the field of view, the reverse is true, since the Right thyratron is capable of being fired and the left is not. When either the Left or Right thyratrons are fired and the target moves to the other azimuth half of the field of view it is naturally necessary to extinguish the one thyratron as the other is fired to indicate the new target position. This is accomplished by means of a "flip-flop" circuit incorporating the capacitor 217. For instance, when the Left thyratron is fired, and the target moves to the right, the Right thyratron will fire. The Right thyratron plate voltage will then drop from about 340 volts to 9 volts. This entire decrease in voltage is transmitted through capacitor 217 in the form of a negative pulse to the anode of the Left thyratron. Since that anode is already at 9 volts, due to its fired condition, it pulses approximately 330 volts negative and is deionized. Thus the Left thyratron is deionized as the Right one fires. The Right thyratron then remains fired and the Left deionized until the target appears in the left half of the field of view to reverse the "flip-flop" process.

When either the Right or Left thyratron is fired by a target signal its respective series plate relay (218 or 219) is energized. The contacts operated by relays 218 and 219 are normally open and the circuits controlled by those contacts are so arranged as to cause a signal to appear at the right output 250 and the left output 251 when their associated contacts are closed and if desired another set of contacts may be provided as shown in the drawings for each of those relays so as to energize a right indicator lamp and a left indicator lamp provided their associated contacts are closed.

The elevation switch circuit operates very similarly to the azimuth circuit. Tubes 220 and 221 together with their associated circuits form a symmetrical multivibrator synchronized by the negative sync pulses from the elevation sweep generator which are applied to the elevation sync input 222. The outputs of this multivibrator feed the Up and Down thyratrons to accomplish elevation switching in the same manner as the azimuth circuit.

Referring now to Fig. 3, the chief difference in the azimuth and elevation switching circuits lies in the fact that each individual target signal pulse occurs at the same phase position of succeeding azimuth square wave switching cycles in the azimuth circuit. On the other hand in the elevation circuit all of a burst of target signal from a target occurs during a portion of one cycle of the elevation square wave switching voltage. For this reason only one individual target pulse occurs during either the right half or the left half of each azimuth multivibrator cycle. The first signal pulse of a typical target signal burst then fires the Right or Left thyratron depending on the target location; and that thyratron remains fired until the signal position reverses in the field of view. The same process also occurs in the elevation switching circuit except when a target occurs at the Up-Down change over point in the field of view. At this position a portion of the targe signal pulses will occur during the Up half of the elevation multivibrator cycle and the remainder of the individual pulses will occur during the Down half of the elevation multivibrator cycle. This will thus cause the Up-Down thyratron to fire alternately at the frame frequency and result in relay chatter at that frequency or sub-harmonic depending on the relay. This region of elevation center slop will be equal to the elevation target dimensions in degrees, since that dimension determines the width of (or number of individual pulses in) the target signal burst. When a target subtends a small elevation dimension and a minimum of center slop is desirable, a very small amount will be obtained since it is essentially equal to the target elevation dimension. This is therefore a desirable feature.

When either Up or Down thyratron is fired, it energizes its respective Up or Down relay to produce a signal indicative of the elevation half of the field of view in which the target appears in a manner similar to the azimuth circuits.

Thus a signal entering the quadrant signal generator is applied to each of the four thyratrons but only fires one of the two azimuth thyratrons and one of the two elevation thyratrons to indicate the quadrant of the field of view in which it is located.

In a particular embodiment of this invention the apparatus was constructed to give information on course changes of a target at the rate of 100 per second.

In the preferred embodiment the iconoscope tube 1 was the type known as 1848 which has the photo-sensitive electrode 2 having the dimensions 2¼ inches by 3 inches. A standard camera lens was used in the optical system 3 and that lens had a focal length of 13.5 centimeters which will cover on the electrode 2 a field 24° x 31½°. The selected lens had an effective diameter of 3.86 centimeters giving a speed of f 3.5. The lens system further had a diaphragm which can be set for any opening down to f 32. A focusing mount for the lens system covered the range of 4 feet to infinity.

Consideration of the theory upon which this target seeker operates will show that a high grade lens is not necessary. If the lens has aberration, causing the rise from a single point in the target to form a small circle instead of a pin point in the image, no harm will be done except in extreme cases where a slight increase in center slop may be noted on the quadrant indicating output unit.

Biasing lighting from a small bulb 7 is arranged to illuminate the walls of the iconoscope but not the front of the mosaic electrode 2. This is of great help in improving the signal to noise ratio as well as the absolute sensitivity of the iconoscope. It is especially helpful when the target causes a bright spot in a dark background giving very low average illumination of the mosaic.

Using 100 C. P. S. for elevation scan and 16,000 C. P. S. for azimuth scan a raster containing 160 lines will result. 11 per cent of these lines are lost during the elevation blanking interval (when the beam is returning from bottom to top in order to start a new scanning cycle). The remaining 142 lines cover an elevation of 10°, providing a resolution of 14.2 lines per degree.

A 100 foot target 5 miles distant sub-tends 13 minutes of arc. Such a target image would be covered by 14.2×13/60 equals 3+ scanning lines. This is about the minimum for a satisfactory signal burst.

In order for the beam of the iconoscope to be scanned at the above noted frequency the circuits for the azimuth sweep generator 8 and the elevation sweep generator 9 were constructed in accordance with Fig. 4.

Azimuth chain

The azimuth scanning rate is established by tube 401 which preferably is a tube having two triode sections and associated circuits to form a conventional multivibrator. The time constants in the two grid circuits are unequal so that the anode 402 is positive for only about 25% of the time of one cycle. The rate is adjusted by resistor 403 to 1600 C. P. S. The short pulse of negative polarity present at anode 404 is differentiated by capacitor 405 and resistor 406 and is applied to the grid 407 of tube 408 which is preferably a tube having two triode sections, the first section of which has its circuit arranged so that it will function as an amplifier and clipper to form a "driving" pulse at the terminal 409. This is a positive pulse lasting about 5% of one cycle. That "driving" pulse is applied to the grid 410 of tube 411 as well as to the grid of 412 of tube 413. The discharge tube 413 preferably is a pentode tube, such as for example a 6SJ7, in order that it may be modulated to provide keystone correction. The charging capacity is 22 mmf. (capacitor 414) which is charged slowly through resistor 415. The resulting sawtooth wave is impressed on the grid of tube 416. A peak added to the sawtooth by the resistor 417 assists in reversing the current in the deflection yoke and helps to maintain a linear rate of scan. Additional amplification is provided by tube 418 and tube 419. To obtain a correct impedance match, the tube 419 is transformer coupled to the azimuth deflection coils in the yoke. Part of the cathode bias voltage for tube 419, the drop across center-tapped potentiometer 420, is used for centering the azimuth scan on the mosaic. Resistor 421 which is connected directly across the azimuth coils is to damp the transient occurring at the start of the scan.

Elevation chain

The elevation scanning chain is similar to the azimuth, except that it operates at 100 C. P. S. Pulses originate in the multivibrator 422. Time constants are selected so that the anode of tube 423 remains negative 10% of the cycle. The variable resistor 424 is used to set the rate at exactly 100 C. P. S. The negative pulse is differentiated by resistor 425 and capacitor 426, then clipped and amplified by tube 427 to give a positive driving pulse lasting 17% of one cycle. The driving pulse feeds the elevation sync amplifier which is tube 450 and the discharge tube 428. A 1/10 microfarad condenser 429 is used as the charging capacity feed through 1.5 megohms resistor 430. Across the charging capacity appears a sawtooth wave which actuates the keystone amplifier tube 431 and the output stage tube 432. Elevation scanning amplitude is controlled by potentiometer 433. The elevation coils in the deflection yoke are coupled through the transformer 434. Centering voltage comes from the center-tapped potentiometer 435.

Keystone correction

Keystone correction is necessary if exactly the same azimuth field is required at both the top and bottom of the elevation scan. This is because the electron gun in the iconoscope has been placed at an angle with the mosaic so there will be no interference with the optical system. Corrections are made by causing the azimuth scan to decrease in amplitude as the beam moves in elevation from the bottom toward the top of the mosaic. The voltage charging capacitor 414 is modulated with 100 cycles sawtooth from the anode of tube 431. This varies the amplitude of the 16,000 C. P. S. azimuth sawtooth at 100 C. P. S. rate. However, it also introduces a 100 C. P. S. component which must be balanced out by a voltage from the Skew control 436 applied to the anode of the amplifier 416. In practice it has been found that unless it is necessary to cover the entire mosaic or to maintain a field of view which is exactly rectangular the keystone correction can be omitted. With a 13.5 centimeter lens covering a field 10° high by 20° wide the azimuth scan will vary only about 1/4° from top to bottom when no correction is used.

Synchronizing signals

In order to suppress unwanted and spurious signals the video amplifier must be made insensitive during the return time of the scanning beam. This is done by the blanking signal, a composite wave containing 16,000 C. P. S. pulses 23% long and 100 C. P. S. pulses 11% long. The blanking signals come from their respective multivibrators and are combined at the cathode of tube 437. At this point the pulses are positive and about 18 volts in amplitude.

Iconoscope blanking

The elevation return time is sufficiently long to allow the beam to sweep several times across the mosaic in the azimuth direction. This causes lines to appear in the resulting signal at the points where the mosaic has been discharged. The positive pulse from tube 460 of the multivibrator 422 is amplified by tube 438. A .05 mf. condenser 439 from plate to ground retards the normally steep edges of the multivibrator pulse and increases the width slightly in order to prevent the generation of additional spurious signals by the sudden change in the scanning beam current. The blanking signal is negative and just sufficient in amplitude (about 9 volts) to cut the scanning beam off during the retrace time. Coupling to the iconoscope control grid is through the high voltage blocking condenser 440 and the grid resistor 441.

In the above noted particular embodiment, which was constructed in accordance with the principles of this invention, the apparatus 12 of Fig. 1 was constructed in accordance with Fig. 5.

Video amplifier

Azimuth resolution should equal that of elevation and with a given scanning rate is governed by the response of the signal (or "video") amplifier. 25% of each line is lost during the azimuth blanking period (while the beam returns from right to left ready to start a new line). The target which sub-tends 13 minutes will produce a signal lasting $$\frac{13 \times 75}{60 \times 20} = 0.81\%$$

of one line. One line lasts 1/16,000 second and the target signal can be assumed 1/2 of a sine wave. The video amplifier must therefore pass a top frequency of 1/16,000 × .0081×2=1 megacycle per second (approximately). Amplifier bandwidth should be restricted as much as possible for noise reasons. The low frequency cutoff is made fairly high to eliminate as much microphonic noise as possible and to assist in the reduction of the "shading" signal. A compromise low frequency of approximately 50 kc. was selected. With very large targets nearly filling the field of view, the leading and trailing edges will be differentiated, thus giving two signals instead of one. This is not detrimental since the missile will home on the edge having greatest contrast. If there were no differentiation and true signal response maintained, the center slop would become excessive in the quadrant signal generator.

Improvement in signal to noise ratio results in the use of a high resistance load 501 on the iconoscope. The resulting loss in high frequency response due to the various shunting capacities including input capacity of tube 502 must be compensated in a later stage (tube 503).

Peaking coils 504, 505 and 506 are used to maintain linear response to one megacycle. Between tubes 503 and 507 is a divider shunted by capacitor 508 which boosts the high frequencies and compensates for their loss in the input circuit. The time constants of the grid coupling elements (capacitor 509, resistor 510 and capacitor 511, resistor 512) are made short to attenuate frequencies below 50,000 cycles per second.

It is desired to operate from a target signal of either phase, that is, as produced by a bright spot on a dark background or a dark spot on a light background. For this reason, it is necessary to use a phase inverter, tube 513 and associated circuit. Signals equal in amplitude but opposite in phase appear at the plate and cathode of this tube.

The anode signal from the phase inverter which includes tube 513 is fed to the control grid of tube 514 and the cathode signal from the phase inverter is fed to the control grid of tube 515. Tubes 514 and 515 together with their associated circuits form a two tube, grid leak detector. Those tubes respond only to a positive pulse so one or the other will conduct regardless of the original phase of the target signal. Because of the high grid leak (resistor 516, 50 megohms) common to both grids, the tube which is conducting will generate enough bias to block the opposite tube and hence reduce its response to noise and other signals. Tube 517 and its associated circuit forms a circuit for cutting off tubes 514 and 515 during the blanking period. Tube 518 and its associated circuit amplifies in a linear manner the negative signal present at the output of the detector stage which includes tubes 514 and 515. Tube 519 and its associated circuit is another grid leak detector which picks the signal of greatest amplitude. Further discrimination is obtained through the driver stage including tube 520 and its associated circuit and still another detector including tube 521. The output signals are obtained from the cathode of tube 521 and these signals are positive bursts of about two volts. This output signal is the signal which is fed to the input of the quadrant signal generator.

Although the quadrant signal generator of this invention is particularly well suited for application in the above noted particular embodiment, it is by no means restricted to such use, for example the amplifiers and cathode follower illustrated in Fig. 2 were necessitated by virtue of the particular signal applied to its input, however, it will be readily recognized that in instances where the signal being applied to the quadrant signal generator already has the necessary characteristics, those stages will not be used.

What is claimed is:

1. In a target seeker of the type employing an image tube having a photoelectric mosaic, optical means for forming an image of a target on said mosaic, means for line scanning said mosaic with an electron beam which repeatedly sweeps across said mosaic horizontally from left to right at a comparatively high rate and repeatedly sweeps across said mosaic vertically from top to bottom at a comparatively low rate, and means for generating an output signal whenever said beam intercepts the target image on said mosaic: a quadrant signal generator for indicating the position of said target image with respect to the vertical and horizontal axes of said mosaic comprising Up, Down, Right and Left indicating circuits each containing a circuit energizing means adapted to be actuated by said target output signal, means for applying said output signal simultaneously to all of said circuit energizing means, means synchronized with said horizontal sweep for disabling said Right circuit energizing means when said scanning beam is to the left of said vertical axis and for disabling said Left circuit energizing means when said scanning beam is to the right of said vertical axis, and means synchronized with said vertical sweep for disabling said Down circuit energizing means when said scanning beam is above said horizontal axis and for disabling said Up circuit energizing means when said scanning beam is below said horizontal axis.

2. In a target seeker of the type employing an image tube having a photoelectric mosaic, optical means for forming an image of a target on said mosaic, means for line scanning said mosaic with an electron beam which repeatedly sweeps across said mosaic horizontally from left to right at a comparatively high rate and repeatedly sweeps across said mosaic vertically from top to bottom at a comparatively low rate, and means for generating an output signal whenever said beam intercepts the target image on said mosaic: a quadrant signal generator for indicating the position of said target image with respect to the vertical and horizontal axes of said mosaic comprising Up, Down, Right and Left indicating circuits each containing the anode-cathode path of an electron tube in series therewith, means for applying said output signal to the control grids of said electron tubes in parallel, means synchronized with said horizontal sweep for generating two symmetrical square voltage waves of opposite phase and of the same period as said horizontal sweep said waves being timed relative to said sweep so that the transition between maximum and minimum voltages occurs as said beam crosses said vertical axis, means for applying the square wave having minimum voltage during the left half of the horizontal sweep to a grid of the electron tube in said Right circuit, means for applying the other square wave to a grid of the electron tube in said Left circuit, means synchronized with said vertical sweep for generating two additional symmetrical square voltage waves of opposite phase and of the same period as said vertical sweep said waves being timed relative to said sweep so that the transition between maximum and minimum voltages occurs as said beam crosses said horizontal axis, means for applying the additional square wave having minimum voltage during the upper half of said vertical sweep to a grid of the electron tube in said Down circuit, and means for applying the other additional square wave to a grid of the electron tube in said Up circuit, the maximum and minimum values of said square waves being such that said target output signal can render any of the tubes in said indicating circuits conductive if applied during the maximum voltage half-cycle of the applied square wave but can not render the tube conductive if applied during the minimum voltage half-cycle.

3. Apparatus as claimed in claim 2 in which the tubes in said indicating circuits are thyratrons and in which capacitive couplings are provided between the anodes of the thyratrons in the Up and Down circuits and between the anodes of the thyratrons in the Left and Right circuits for extinguishing one thyratron when the other is fired.

References Cited in the file of this patent

UNITED STATES PATENTS

| | | |
|---|---|---|
| 2,403,975 | Graham | July 16, 1946 |
| 2,473,175 | Ridenour | June 14, 1949 |
| 2,532,063 | Herbst | Nov. 28, 1950 |
| 2,581,589 | Herbst | Jan. 8, 1952 |
| 2,623,173 | Lubcke et al. | Dec. 23, 1952 |